United States Patent
Ableidinger (10) Patent No.: US 12,367,047 B2
(45) Date of Patent: Jul. 22, 2025

(54) DEBUG TRACE CIRCUITRY CONFIGURED TO GENERATE A RECORD INCLUDING AN ADDRESS PAIR AND A COUNTER VALUE

(71) Applicant: SiFive, Inc., San Mateo, CA (US)

(72) Inventor: Bruce Ableidinger, Vancouver, WA (US)

(73) Assignee: SiFive, Inc., Santa Clara, CA (US)

(*) Notice: Subject to any disclaimer, the term of this patent is extended or adjusted under 35 U.S.C. 154(b) by 94 days.

(21) Appl. No.: 18/502,270

(22) Filed: Nov. 6, 2023

(65) Prior Publication Data
US 2024/0192960 A1    Jun. 13, 2024

Related U.S. Application Data

(60) Provisional application No. 63/432,099, filed on Dec. 13, 2022.

(51) Int. Cl.
 G06F 9/44 (2018.01)
 G06F 9/30 (2018.01)
 G06F 9/38 (2018.01)

(52) U.S. Cl.
 CPC ........ G06F 9/3861 (2013.01); G06F 9/30058 (2013.01)

(58) Field of Classification Search
 CPC .................. G06F 9/3861; G06F 9/30058
 See application file for complete search history.

(56) References Cited

U.S. PATENT DOCUMENTS

| | | | | |
|---|---|---|---|---|
| 5,590,354 A * | 12/1996 | Klapproth | ........ | G01R 31/31705 714/E11.214 |
| 5,625,785 A * | 4/1997 | Miura | ................. | G06F 11/3656 714/38.1 |
| 5,715,440 A * | 2/1998 | Ohmura | .............. | G06F 11/3648 714/E11.214 |
| 5,729,727 A * | 3/1998 | Suzuki | .................. | G06F 9/3804 712/E9.056 |
| 5,953,529 A * | 9/1999 | Kato | ..................... | G06F 9/4484 712/E9.082 |
| 6,279,103 B1 * | 8/2001 | Warren | ............... | G06F 11/3636 714/45 |
| 6,321,290 B1 * | 11/2001 | Yamashita | .......... | G06F 11/3636 712/225 |
| 6,442,092 B1 * | 8/2002 | Tomita | ................. | G11C 16/102 365/219 |

(Continued)

*Primary Examiner* — Cheng Yuan Tseng
(74) *Attorney, Agent, or Firm* — Kilpatrick Townsend & Stockton LLP (57) ABSTRACT

Systems and methods are disclosed for debug path profiling. For example, a processor pipeline may execute instructions. A debug trace circuitry may, responsive to an indication of a non-sequential execution of an instruction by the processor pipeline, generate a record including an address pair and one or more counter values. The address pair may include a first address corresponding to a first instruction before the non-sequential execution and a second address corresponding to a second instruction resulting in the non-sequential execution. The one or more counter values may indicate, for example, a count of instructions executed, a type of instruction executed, cache misses, cycles consumed by cache misses, translation lookaside buffer misses, cycles consumed by translation lookaside buffer misses, and/or processor stalls.

17 Claims, 8 Drawing Sheets

(56) References Cited

U.S. PATENT DOCUMENTS

| | | | | |
|---|---|---|---|---|
| 6,681,280 B1* | 1/2004 | Miyake | ............... | G06F 9/4812 |
| | | | | 710/48 |
| 6,961,872 B2* | 11/2005 | Yamamoto | ............. | G06F 11/28 |
| | | | | 714/E11.178 |
| 7,185,176 B2* | 2/2007 | Tanaka | ............... | G06F 9/30036 |
| | | | | 712/E9.071 |
| 7,331,046 B2* | 2/2008 | Shida | ..................... | G06F 8/65 |
| | | | | 713/1 |
| 7,487,367 B2* | 2/2009 | Belnet | ................. | G06F 12/1491 |
| | | | | 711/163 |
| 7,533,251 B2* | 5/2009 | Ubukata | ............. | G06F 9/4486 |
| | | | | 712/227 |
| 7,661,105 B2* | 2/2010 | Watt | ...................... | G06F 21/74 |
| | | | | 713/193 |
| 7,757,071 B2* | 7/2010 | Yokoi | ................ | G06F 9/30054 |
| | | | | 712/238 |
| 8,245,195 B2* | 8/2012 | Lai | ..................... | G06F 11/3648 |
| | | | | 717/124 |
| 9,529,595 B2* | 12/2016 | Lin | ..................... | G06F 9/30054 |
| 10,831,639 B2* | 11/2020 | Gliwa | ................ | G06F 11/3471 |
| 2006/0041868 A1* | 2/2006 | Huang | ............... | G06F 9/3844 |
| | | | | 717/131 |
| 2007/0220337 A1* | 9/2007 | Itoh | ..................... | G06F 11/321 |
| | | | | 714/E11.182 |
| 2024/0403190 A1* | 12/2024 | Williams | ............ | G06F 11/348 |

* cited by examiner

| exponent | front-end input divisor and counter resolution | max count =0xFFF when exponent = 0, otherwise 0x1FFF << (exponent-1) |
|---|---|---|
| 0 | 1 | 4,095 |
| 1 | 2 | 8,191 |
| 2 | 4 | 16,382 |
| 3 | 8 | 32,764 |
| 4 | 16 | 65,528 |
| 5 | 32 | 131,056 |
| 6 | 64 | 262,112 |
| 7 | 128 | 524,224 |
| 8 | 256 | 1,048,448 |
| 9 | 512 | 2,096,896 |
| 10 | 1024 | 4,193,792 |
| 11 | 2048 | 8,387,584 |
| 12 | 4096 | 16,775,168 |
| 13 | 8192 | 33,550,336 |
| 14 | 16384 | 67,100,672 |
| 15 | 32768 | 134,201,344 |

DEBUG TRACE CIRCUITRY CONFIGURED TO GENERATE A RECORD INCLUDING AN ADDRESS PAIR AND A COUNTER VALUE

CROSS-REFERENCE TO RELATED APPLICATION(S)

This application claims priority to and the benefit of U.S. Provisional Patent Application Ser. No. 63/432,099, filed Dec. 13, 2022, the entire disclosure of which is hereby incorporated by reference.

TECHNICAL FIELD

This disclosure relates generally to integrated circuits, and more specifically, to debug trace circuitry configured to generate a record including an address pair and a counter value.

BACKGROUND

Integrated circuits for executing instructions (e.g., processors or microcontrollers) often include a debug port that enables a host device (e.g., a personal computer or laptop) to communicate with the debug port via a set of conductors (e.g., a serial port). For example, a host device may connect to the debug interface of an integrated circuit using a debug probe (e.g., a Joint Test Action Group (JTAG) probe). For example, the debug interface may be used by the host device to write input data (e.g., firmware images and/or debug commands) to the integrated circuit and/or read output data (e.g., register values or other memory contents) from the integrated circuit.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

The debug interface may be used to monitor the performance of a processor executing a program (e.g., instructions per cycle), so that the program can be updated to improve performance, either manually or automatically with a compiler (sometimes called autoFDO, or automatic feedback-directed optimization). In some cases, it may be desirable to monitor performance associated with the non-sequential executions of instructions, such as branch instructions that are taken. However, branches can occur frequently in a program, and based on the speed of execution of the program, monitoring such performance may involve a high bandwidth of data being transferred to a memory. While the program can be stopped periodically to record the data for measuring performance, slowing the program by more than a threshold (e.g., 1% of the run time speed) can cause an excessive degradation of the program and/or reduce the accuracy of the measurements.

Implementations of this disclosure address problems such as these by implementing a circuitry configured to capture address pairs and counter values associated with the non-sequential execution of instructions (e.g., branches taken). The address pairs and counter values may be stored as trace records in a trace buffer (e.g., a limited size, circular buffer implemented by the integrated circuit for storing, for example, 32 records). The circuitry can freeze or stop acquisition of records in the trace buffer for a limited time while the records are transferred from the trace buffer to a host device (e.g., a memory of a host device, such the host device 320). This may enable capturing a limited amount of trace, periodically, for correlating counter values to branches taken by a program. This may enable tracing with a reduced or eliminated degradation of the program so that the program, can be modified to improve performance. In some implementations, a record may include a "from" address (e.g., a location from where a branch is taken), a "to" address (e.g., a location to where is branch leads), and one or more of the counter values. The counter values may include, for example, counts of instructions executed, specific types of instructions executed such as loads, stores, or vector instructions, cache misses (e.g., for an instruction cache and/or for a data cache), cycles consumed by cache misses, translation lookaside buffer (TLB) misses, cycles consumed by TLB misses, and/or processor stalls. In some implementations, the counters may be delta counters meaning they are cleared to zero when the counter values are stored as a record in the trace buffer. In some implementations, the counter values may be encoded in a floating point format (e.g., with a 12 bits of mantissa and 4 bits of exponent) to enable dynamic scaling. In some implementations, the counters may be saturation counters meaning they increment until they reach a maximum value (e.g., and they no longer increment after reaching the maximum value).

Figure 1:
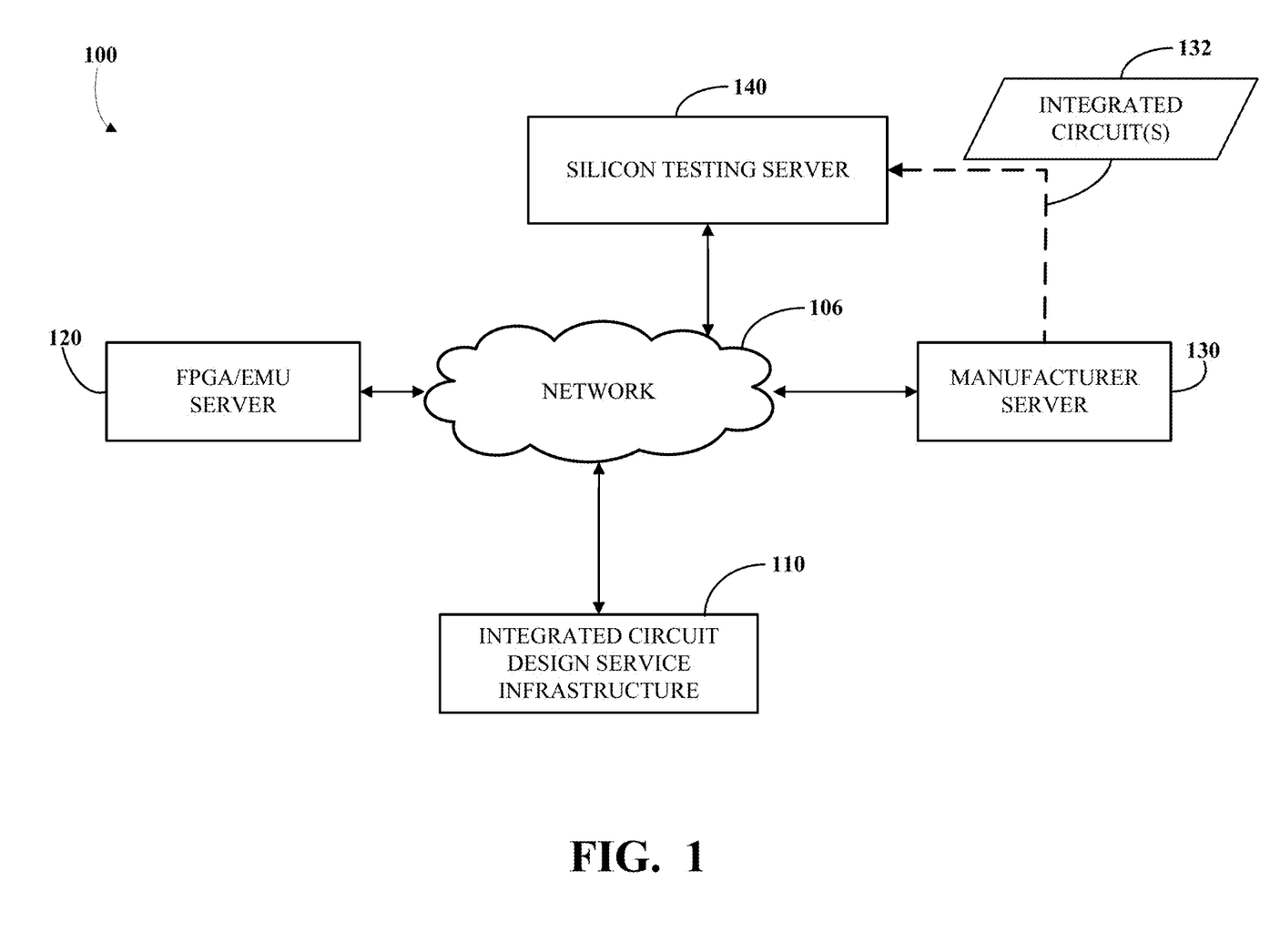
FIG. 1 is a block diagram of an example of a system for facilitating generation and manufacture of integrated circuits.

To describe some implementations in greater detail, reference is first made to examples of hardware and software structures used to implement a system including debug trace circuitry configured to generate a record including an address pair and a counter value. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3 and 4.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
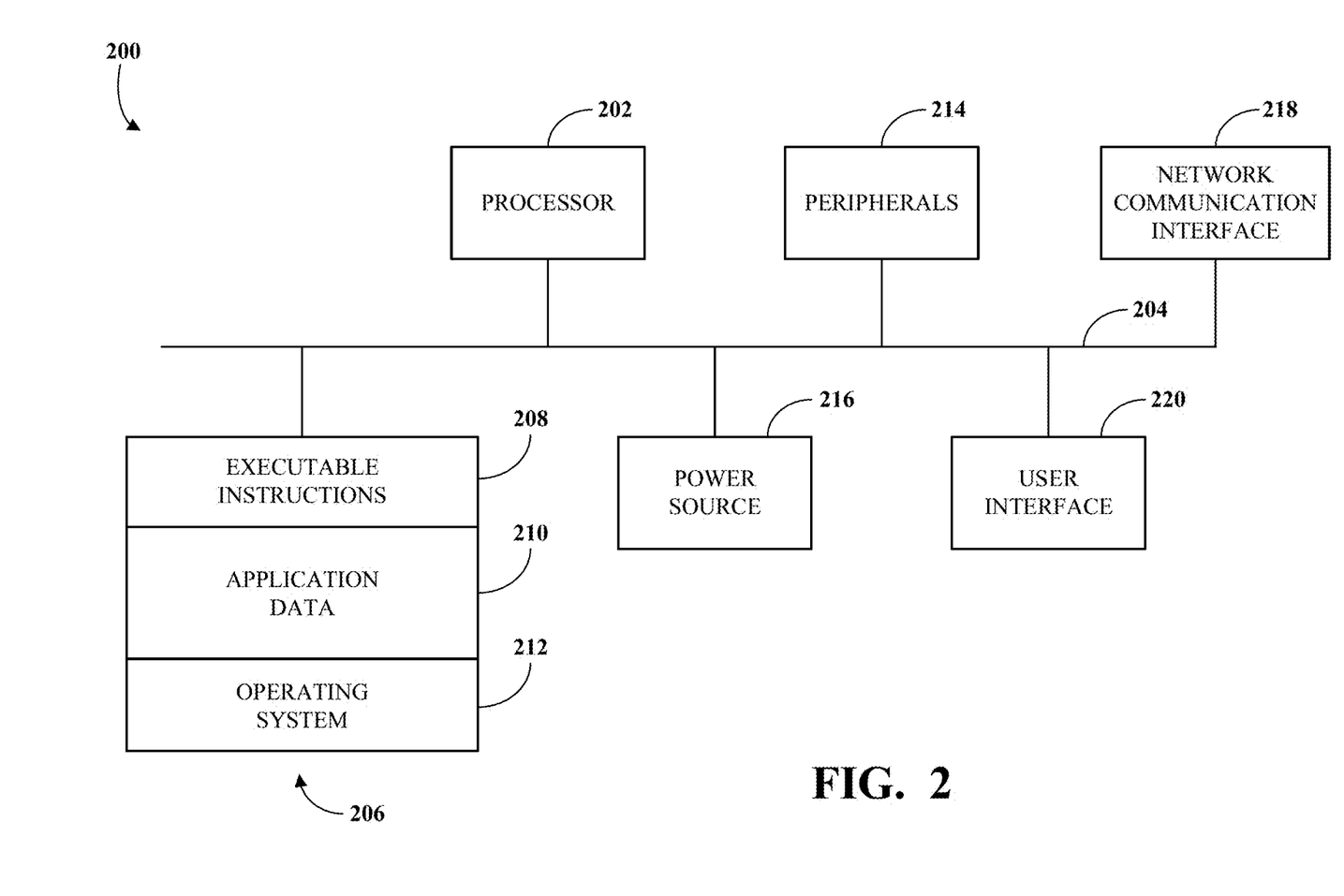
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3 and 4.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
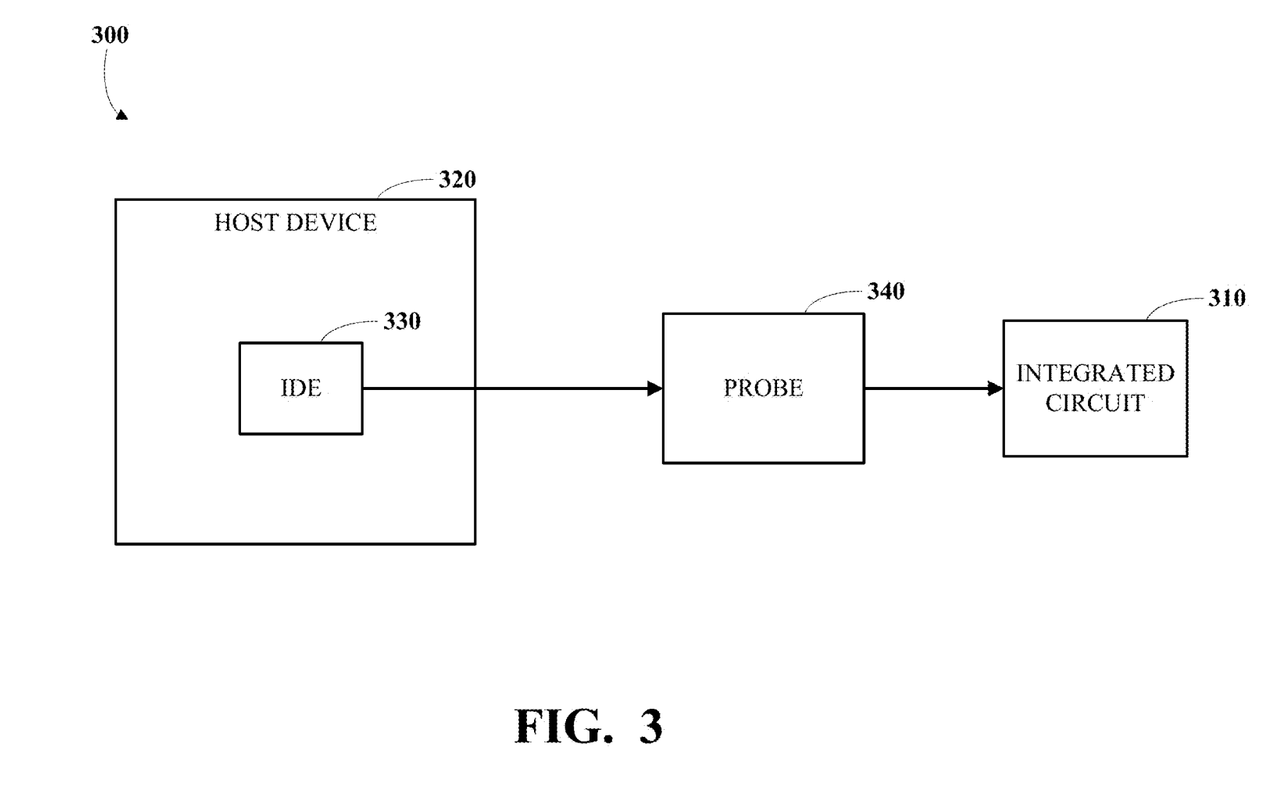
FIG. 3 is a block diagram of an example of a system for debugging an integrated circuit for executing instructions.

FIG. 3 is a block diagram of an example of a system 300 for debugging an integrated circuit 310 (e.g., an SoC) for executing instructions. The system 300 may include the integrated circuit 310 and a host device 320 (e.g., a personal computer, such as a laptop) that will connect to the integrated circuit 310 to send and receive data, such as data to facilitate debugging of software (e.g., firmware) that will be executed by the integrated circuit 310. The host device 320 may include integrated development environment (IDE) software 330 (e.g., Eclipse) that runs on the host device 320. The host device 320 may be configured to access (e.g., using the integrated development environment software 330) the integrated circuit 310 via a probe 340 (e.g., a JTAG compliant probe) that connects the host device 320 to the integrated circuit 310. In some implementations (not shown in FIG. 1), the host device 320 may connect directly to the integrated circuit 310 (e.g., via a passive cable including conductors corresponding to the conductors of a debug interface of the integrated circuit 310).

Figure 4:
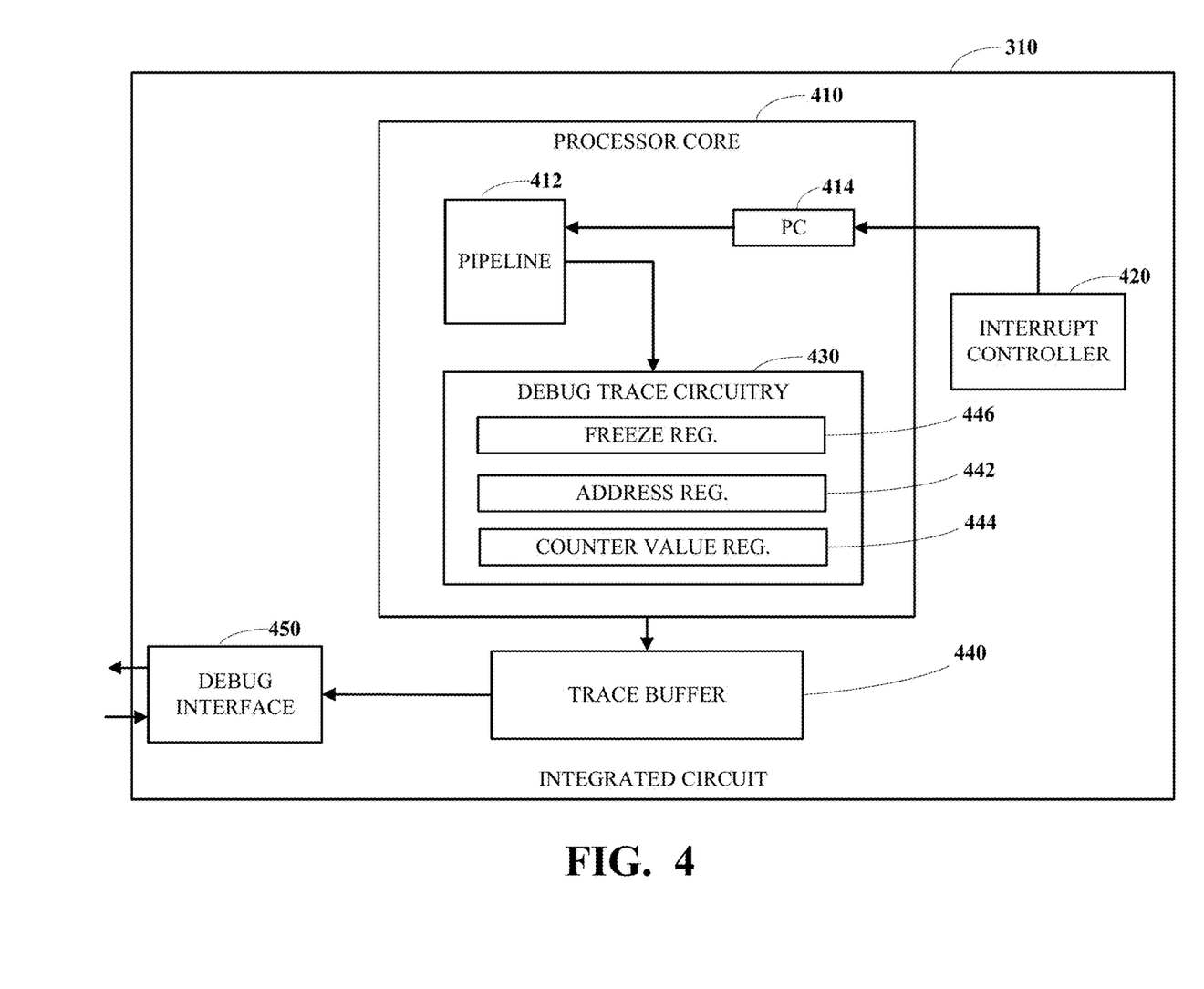
FIG. 4 is a block diagram of an example of an integrated circuit for executing instructions that includes debug trace circuitry configured to generate a record including an address pair and a counter value.

FIG. 4 is a block diagram of an example of an integrated circuit 310 for executing instructions. The integrated circuit 310 includes debug trace circuitry 430 configured to generate a record including an address pair and a counter value. The record may be stored in a trace buffer 440. For example, the integrated circuit 310 may be a microprocessor, a microcontroller, or another integrated circuit configured to execute instructions. The integrated circuit 310 includes a processor core 410 (e.g., an IP core or a hart), including a processor pipeline 412 and a program counter register 414. The integrated circuit 310 also includes an interrupt controller 420 and a debug interface 450. For example, the integrated circuit may be configured to implement the process 700 of FIG. 7 and/or the process 800 of FIG. 8.

The integrated circuit 310 includes a processor core 410 configured to execute instructions (e.g., RISC-V instructions, ARM instructions, or x86 instructions). In some implementations, although not shown in FIG. 4, the integrated circuit 310 includes multiple processor cores. The processor core 410 includes the pipeline 412 configured to execute instructions, including control flow instructions (e.g., branch instructions). The pipeline 412 includes one or more fetch stages that are configured to retrieve instructions from a memory system of the integrated circuit 310. For example, the pipeline 412 may fetch instructions via an L1 instruction cache. The pipeline 412 may include additional stages, such as decode, rename, dispatch, issue, execute, memory access, and write-back stages. For example, the pipeline 412 may read and write data via an L1 data cache. For example, the processor core 410 may include a pipeline 412 configured to execute instructions of a RISC-V instruction set.

The processor core 410 includes data storage circuitry that is configured to store an architectural state and a microarchitectural state of the processor core 410. For example, the program counter register 414 may be configured to store an address of a next instruction to be fetched from the memory system and executed by the pipeline 412. In some implementations, the processor core 410 may include the debug trace circuitry 430 (e.g., the pipeline 412 and the debug trace circuitry 430 may be implemented together in a processor core 410). The debug trace circuitry 430 may include a set of trace registers, such as one or more address registers 442 for storing one or more addresses and one or more counter value registers 444 for storing one or more counter values. For example, the set of trace registers may be used to generate a record for profiling a software execution path. In some implementations, the trace buffer 440 may be implemented in the integrated circuit 310, external to the processor core 410. In some implementations, the trace buffer 440 may be implemented in the processor core 410 (e.g., together with the pipeline 412 and the debug trace circuitry 430). In some implementations, a write to one or more registers in the set of trace registers may trigger generation of a debug trace message including the record. For example, the set of trace registers may be used to provide a data channel to enable software running on the processor core 410 to transfer data to a host device (e.g., a memory of the host device 320) via the trace buffer 440.

The interrupt controller 420 may be configured to issue hardware interrupts to the processor core 410 and possibly other processor cores of the integrated circuit 310. For example, the interrupt controller 420 may route interrupts from peripherals (e.g., a direct memory access (DMA) controller) of the integrated circuit 310 and/or other external hardware connected to interrupt request lines of the integrated circuit 310 to the processor core 410. In some implementations, the interrupt controller 420, upon receiving a hardware interrupt, updates the program counter register 414 to the address of an interrupt handling routine configured for the hardware interrupt. In some implementations, software interrupts (e.g., exceptions and traps) may also update the program counter register 414.

The integrated circuit 310 includes the debug trace circuitry 430 configured to generate debug trace messages. For example, the debug trace may be a profile-based or an event-based trace that generates debug trace messages responsive to control flow changes in the code running on the processor core 410, such as, function calls, returns, and/or interrupts (e.g., hardware interrupts, exceptions, or traps). The debug trace circuitry 430 may be configured to store records that are generated in the trace buffer 440. The records may then be sent as debug trace messages, such as to the host device 320.

The trace buffer 440 may be configured to store a sequence of records. The trace buffer 440 may be a circular buffer that overwrites an oldest record with a newest record (e.g., a most recent record from the debug trace circuitry 430). In some implementations, the trace buffer 440 may comprise static random access memory (SRAM). In some implementations, a portion of an SRAM or another data store on the integrated circuit 310 may be reserved for use as the trace buffer 440. The trace buffer 440 may include storage that is close to the pipeline 412, having a limited size for storing a limited set of records (e.g., 32 records, such as the last 32 address pairs). The records may be transferred from the trace buffer 440 to a memory (e.g., associated with the host device 320) via the debug interface 450.

The integrated circuit 310 includes the debug interface 450 comprising two or more conductors (e.g., conductors of a JTAG interface) with input/output drivers configured to, when enabled, transmit and receive signals between the processor core 410 and an external host device (e.g., the host device 320) via the two or more conductors. For example, the debug interface 450 may be compliant with a standard, such as the RISC-V debug specification. In some implementations, the integrated circuit 310 is configured to transmit contents of the trace buffer 440 to a host device (e.g., the host device 320) via the debug interface 450 of the integrated circuit 310.

The debug trace circuitry 430 may receive an indication of a non-sequential execution of an instruction by the pipeline 412. For example, the non-sequential execution could be caused control flow changes in the code running on the processor core 410, such as, function calls, returns, and/or interrupts (e.g., hardware interrupts, exceptions, or traps). For example, the non-sequential execution could be caused by a branch instruction that is taken when executed in the pipeline 412. Taking the branch instruction may cause an update to the program counter register 414 that is non-sequential. In another example, the non-sequential execution could be caused by the interrupt controller 420 issuing a hardware interrupt to the processor core 410. For example, the interrupt controller 420, upon receiving a hardware interrupt, may update the program counter register 414 to the address of an interrupt handling routine configured for the hardware interrupt, thereby causing the non-sequential execution. The debug trace circuitry 430 may be coupled to the pipeline 412 and/or the program counter register 414 to receive the indication. For example, the indication could be based on a branch taken when executed by the pipeline 412, or a non-sequential change in the program counter register 414.

Responsive to the indication, the debug trace circuitry 430 may generate a record including an address pair and one or more counter values. The address pair may include a first address corresponding to a first instruction before the non-sequential execution (e.g., a "from" address, such as a location from where the branch is taken) and a second address corresponding to a second instruction resulting in the non-sequential execution (e.g., a "to" address, such as a location to where the branch leads). The address pair may be stored in the one or more address registers 442. The one or more counter values indicate a count of instructions executed. The one or more counter values may be stored in the one or more counter value registers 444.

In some implementations, a trigger may stop acquisition of records in the trace buffer 440 while records are transferred from the trace buffer 440 to a memory (e.g., associated with the host device 320). The trigger may be generated in different ways. For example, in some implementations, software executing on the target (e.g., the instructions executed by the pipeline 412) may write to a freeze control register 446 to freeze the trace buffer 440 via the debug trace circuitry 430. This could be used, for example, by a software profiler (e.g., perf, a performance analyzing tool in Linux), such as to use a periodic interrupt to sample the trace buffer 440. This may enable correlating counter values to branches taken by a program with a reduced or eliminated degradation of the program so that the program, or a compiler for the program, can be modified to improve performance.

The counter values may include, for example, counts of instructions executed, specific types of instructions executed such as loads, stores, or vector instructions, cache misses (e.g., for an instruction cache and/or for a data cache), cycles consumed by cache misses, TLB misses, cycles consumed by TLB misses, and/or processor stalls. The debug trace circuitry 430 may include circuitry for determining the counter values, such as counters, multiplexors, adders, latches, and/or flip-flops. For example, the counters may be used to count events associated with the pipeline 412. The multiplexors may be used to select an event for monitoring via a counter. The adders could be used to combine values, such as from different counters associated with different pipelines implemented by the processor core 410. The latches, and/or flip-flops may be used for latching bits in the pipeline 412 for the debug trace circuitry 430 to monitor progress of instructions in the pipeline. In some implementations, the counter values may be determined by hardware performance counters which may be implemented by a hardware performance monitor (HPM) implemented by the processor core 410. In some implementations, the counters may be delta counters meaning they are cleared to zero when the counter values are stored as a record in the trace buffer 440. In some implementations, the counter values may be encoded in a floating point format (e.g., with a 12 bits of mantissa and 4 bits of exponent) to enable dynamic scaling. In some implementations, the counters may be saturation counters meaning they increment until they reach a maximum value (e.g., and they no longer increment after reaching the maximum value).

Figure 5:
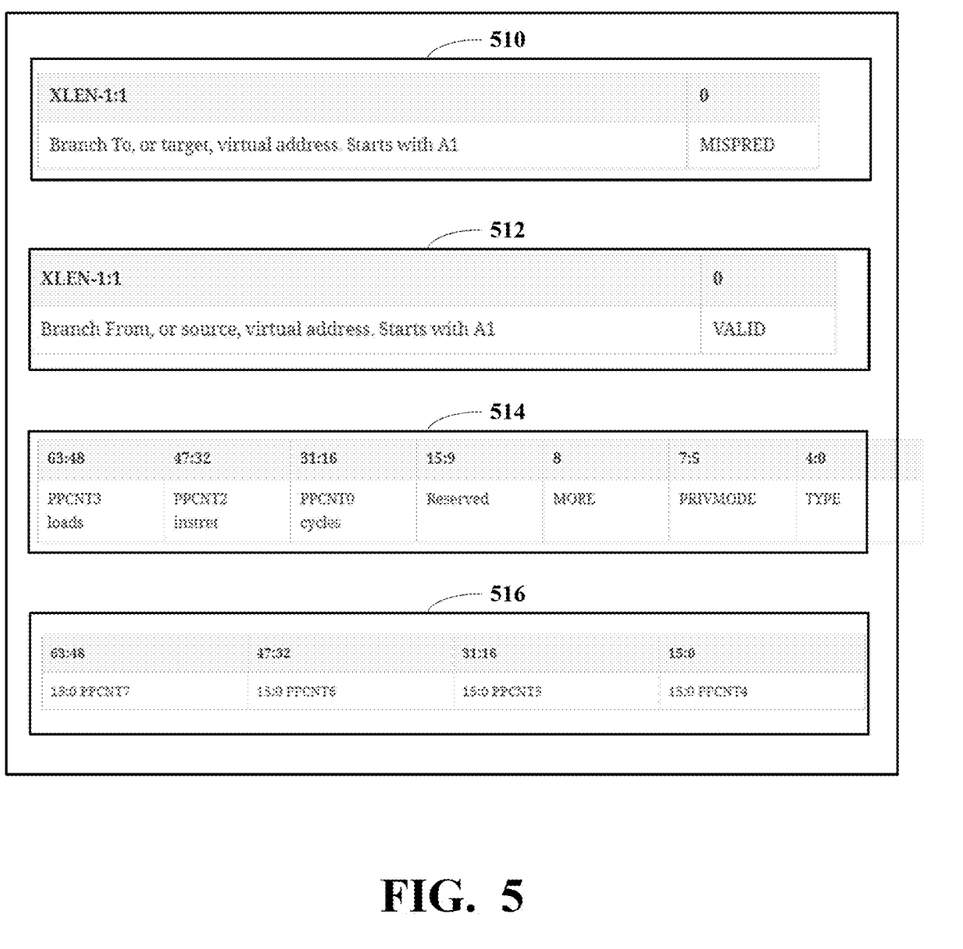
FIG. 5 is an example of a format of a record that may include an address pair and one or more counter values.

FIG. 5 is an example of a format for a record (e.g., a trace format) that may include an address pair and one or more counter values. The record may include one or more fields, including a FROM field 510, a TO field 512, an INFO field 514, and a PERF field 516. For example, the fields could be 64-bit fields, which may be captured by the debug trace circuitry 430. The one or more of fields may be selected for capture based on a run-time trace option (e.g., configured by the host device 320 via the debug interface 450).

The FROM field 510 may capture the "from" address associated with a non-sequential execution (e.g., a taken branch). The from address may be a branch from, or source, address, which could be a virtual address. In some implementations, address bits that are not part of the addressing mode may be sign extended. In some implementations, the width of the address may be increased by 2 for address translation, such as for processor cores with hypervisors and extended addressing. A VALID bit may be set to 1 when the FROM, TO, or both fields have valid data and are written into the trace.

The TO field 512 may capture the "to" address (e.g., virtual address) associated with the non-sequential execution. The to address may be a branch, to or destination, address, which could be a virtual address. In some implementations, a branch mis-predict bit may also be included in the TO field 512. For example, branch mis-predict bit may be 0 if the target address was predicted, or 1 if the target address was mis-predicted and/or if the direction (taken or not-taken) was mis-predicted.

The INFO field 514 (e.g., metadata) may capture performance information associated with the non-sequential execution. TYPE may identify a type of non-sequential address change. TYPE may be valid if either the FROM field 510 or the TO field 512 is valid. PRIVMODE may represent a current encoded 3-bit privilege mode of the instruction of the TO address (e.g., specifying user mode or supervisor mode, such as in Linux). In some implementations, a control bit may be used to enable/disable the recording of PRIVMODE. In some implementations, a process ID (PID) may also be captured for associated the performance with a particular process. MORE may be used to indicate an additional field. For example, MORE could indicate 0 when the PERF field 516 is not included in each record, or 1 when the PERF field 516 is included in each record. PPCNT3, PPCNT2, and PPCNT0 may be counter values. PPCNT3 may count loads (e.g., integer, floating point, and vector load instructions), PPCNT2 may count instructions retired, and PPCNT0 may count cycles. In some implementations, PPCNT3, PPCNT2, and PPCNT0 may be dynamically scaling counters with mantissa and an exponent, such as a 12 bit mantissa and 4 bit exponent. Thus, the first two counters PPCNT0 and PPCNT2 may count cycles and instructions retired. The last digit of the name may align numerically with hardware performance monitor counters HPM0 (cycles) and HPM2 (instructions retired) (e.g., the HPM may also be referred to as the performance monitor unit (PMU)). A performance measurement that may use these two counters is the average ratio of instructions retired per cycles (IPC). This measurement may be an indicator of how far from ideal a processor core (e.g., the processor core 410) may be performing, or alternatively stated, an indicator of where a processor core slow-down may be occurring. For example, a 2-issue core (e.g., two pipelines, each like the pipeline 412) may have an ideal IPC of 2.0. In some implementations, may the INFO field 514 may be programmable to select one or more event types for performance monitoring (e.g., PPCNT3, PPCNT2, and PPCNT0), such as from a performance counter block (e.g., the PMU).

The PERF field 516 (e.g., additional metadata) may capture additional performance information associated with the non-sequential execution. When enabled, each trace record may have 4 fields with the last field being the PERF field 516, which may add 4 more performance counters (e.g., PPCNT7, PPCNT6, PPCNT5, and PPCNT4). For example, the PERF field 516 may comprise a set of four counter values accumulated between the previous TO address and the current FROM address. PPCNT7, PPCNT6, PPCNT5, and PPCNT4 may be counter values. For example, PPCNT7 may count instruction cache misses, PPCNT6 may count a number of cycles in which the instruction cache is not able to provide instructions (e.g., may be caused by an instruction cache miss or an instruction translation lookaside buffer (ITLB) miss), PPCNT5 may count a number of data cache misses, and PPCNT4 may count a number of cycles in which the data cache is not able to provide data to a waiting instruction. The PERF field 516 may be a run-time option to be included or not included in the path profiler trace. If not enabled, each trace record may have 3 fields (e.g., the FROM field 510, the TO field 512, and the INFO field 514). In some implementations, may the PERF field 516 may be programmable to select one or more event types for performance monitoring (e.g., PPCNT7, PPCNT6, PPCNT5, and PPCNT4), such as from a performance counter block (e.g., the PMU).

The performance counters (e.g., PPCNT7, PPCNT6, PPCNT5, PPCNT4, PPCNT3, PPCNT2, and PPCNT0) may be used to calculate performance ratios, such as from combinations of the event types. For example, PPCNT2/PPCNT0=IPC (e.g., average instructions per cycle); PPCNT3/PPCNT2*100=percentage of instructions that are loads; PPCNT4/PPCNT5=average cycles per data cache miss; PPCNT5/PPCNT3=data cache miss ratio; and PPCNT6/PPCNT7=average cycles per instructions cache miss.

Figure 6:
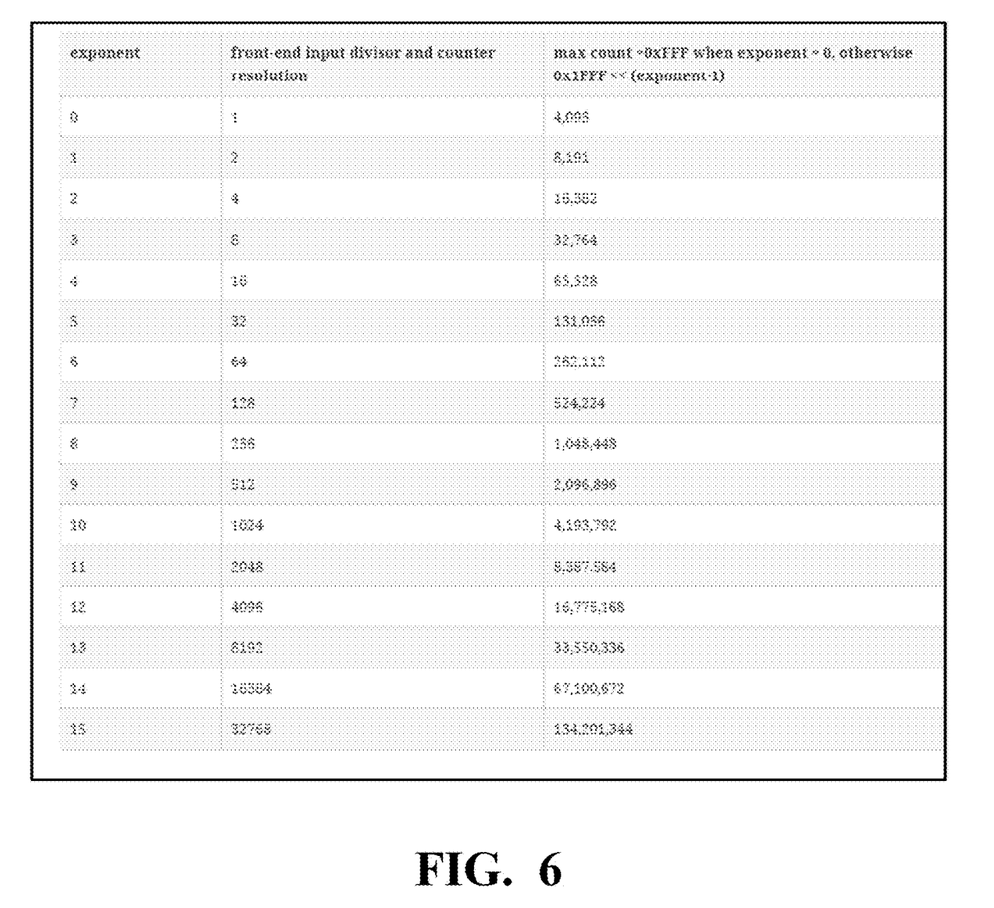
FIG. 6 is an example of dynamic scaling of a counter value.

In some implementations, the performance counters (e.g., PPCNT7, PPCNT6, PPCNT5, PPCNT4, PPCNT3, PPCNT2, and PPCNT0) may use "dynamic scaling." For example, of the 16 bits of each counter, the lower 12 bits may be the mantissa and the upper 4 bits may be the exponent. This type of counter may reduce the count resolution at higher counts but extends the count to a much higher maximum value. This may be a reasonable compromise as there may be no significant difference between two large values close to each other; e.g., the difference between 1,000,000 and 1,000,001. The exponent may represents dividing the event input by a power of 2 (i.e., $2^{exp}$) then routing that to the 12-bit mantissa counter. For example, with additional reference to FIG. 6, an exponent of 0 may mean counting the event input by 1's like a binary up-counter. An exponent of 1 may mean incrementing the mantissa every 2 event ticks. An exponent of 2 may mean the mantissa increments every $4^{th}$ event tick, and so forth, up to an exponent of 15 which may mean incrementing the mantissa every 32,768 event ticks. The dynamic scaling counters may use an implied value of 0x1000 when the mantissa first overflows its 0xFFF value. After this, the binary value may be computed, when the exponent is >0, as 0x1000+mantissa shifted left by the value of the exponent −1. The performance counters (e.g., PPCNT7, PPCNT6, PPCNT5, PPCNT4, PPCNT3, PPCNT2, and PPCNT0) may be saturating meaning the counter stops incrementing when the value of the exponent and the mantissa are all 1's. For example, this count may be equal to 0x1FFF<<14 which is ~134 million, as compared with a straight 16-bit binary count-up counter with a max value of $2^{16}-1$, or 65,535. The counters may be reset when the FROM field 510, the TO field 512, the INFO field 514, and optionally, the PERF field 516, are stored as a record in the trace buffer 440, thus their values may be delta counts between branch records.

Figure 7:
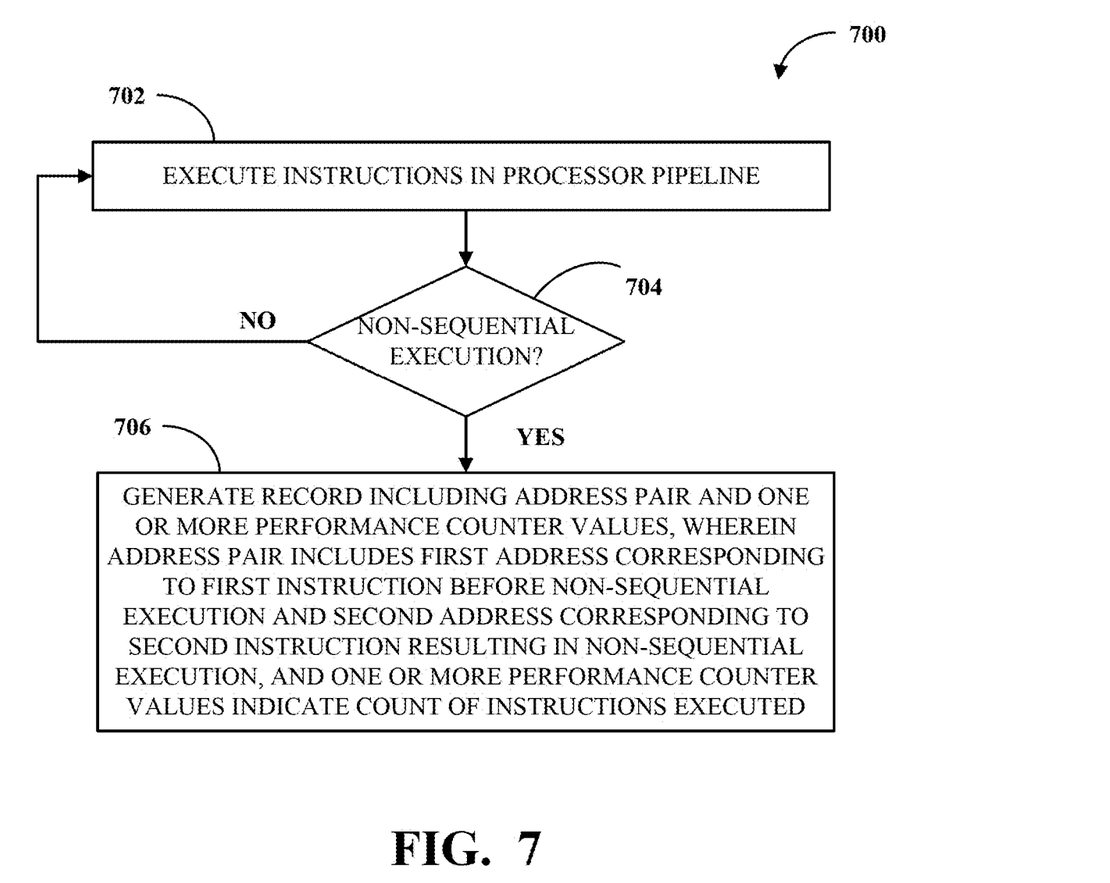
FIG. 7 is a flow chart of an example of a process for generating a record including an address pair and a counter value.

FIG. 7 is a flow chart of an example of a process 700 for generating a record including an address pair and a counter value. For example, the process 700 may be implemented using the integrated circuit 310. At 702, one or more processor pipelines (e.g., the pipeline 412) may execute instructions. The instructions may be associated with a program. The instructions may be executed sequentially at times (e.g., a first instruction at first address, followed by a second instruction at a second address that is a next, or adjacent, address to the first address) and non-sequentially at times (e.g., a first instruction at first address, followed by a second instruction at a second address that is not a next, or adjacent, address to the first address, but is instead separated from the first address by one or more instructions at one or more other addresses).

At 704, a debug trace circuitry (e.g., the debug trace circuitry 430) may determine whether an execution of an instruction by the pipeline is a non-sequential execution. For example, the debug trace circuitry may receive an indication from the pipeline and/or a program counter (e.g., the program counter register 414). If the execution of the instruction is not a non-sequential execution ("no"), but rather a sequential execution, the process may return to 802, However, if the execution of the instruction is a non-sequential execution ("yes"), at 706 the debug trace circuitry may generate a record including an address pair and one or more counter values. The address pair may include a first address corresponding to a first instruction before the non-sequential execution (e.g., a "from" address, such as a location from where the branch is taken) and a second address corresponding to a second instruction resulting in the non-sequential execution (e.g., a "to" address, such as a location to where the branch leads). The address pair may be stored in one or more address registers (e.g., the one or more address registers 442). The one or more counter values may indicate, for example, a count of instructions executed. The one or more counter values may be stored in one or more counter value registers (e.g., the one or more counter value registers 444).

In some implementations, the non-sequential executions (e.g., branches) can correspond to basic blocks, each having a start and an end of a sequence of instructions. For example, a branch taken may correspond to a start or end of the basic block, while a branch not taken may correspond to an instruction in sequence in the basic block. The path profiler may capture taken branches, and thus basic blocks. One or more of the counters (e.g., PPCNT7, PPCNT6, PPCNT5, PPCNT4, PPCNT3, PPCNT2, and PPCNT0) may be captured in a record for a basic block.

Figure 8:
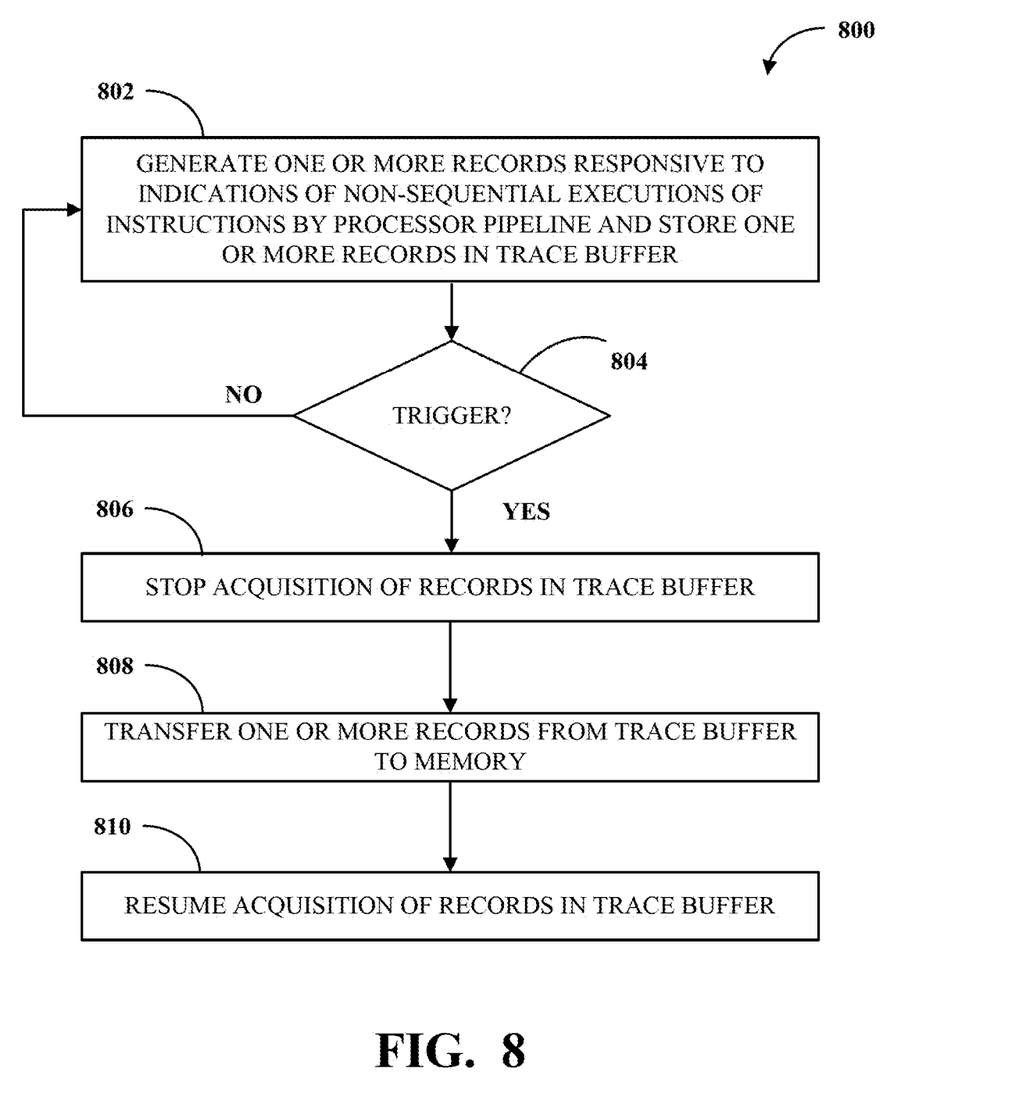
FIG. 8 is a flow chart of an example of a process for transferring records from a trace buffer to a host device.

FIG. 8 is a flow chart of an example of a process 800 for transferring records from a trace buffer to a host device. For example, the process 800 may be implemented using the integrated circuit 310. At 802, a debug trace circuitry (e.g., the debug trace circuitry 430) may generate one or more records responsive to indications of non-sequential executions of instructions by a processor pipeline (e.g., the pipeline 412). The instructions may be associated with a program that is being tested, evaluated, or debugged. The debug trace circuitry may store the one or more records in a trace buffer (e.g., the trace buffer 440). A record in the trace buffer may include an address pair and one or more counter values. The trace buffer have a limited size (e.g., storing 32 records). The trace buffer may be a circular buffer (e.g., overwriting an oldest record with a newest record).

At 804, a debug trace circuitry (e.g., the debug trace circuitry 430) may determine whether a trigger has occurred. The trigger may be used to stop acquisition while records are transferred from the trace buffer to a host device (e.g., a memory associated with the host device, such as the host device 320). The trigger may be generated in different ways. For example, in some implementations, software execution on the target (e.g., the processor core 410) may write to a freeze control register to freeze the trace buffer via the debug trace circuitry. For example, a software profiler (e.g., perf, a performance analyzing tool in Linux) may write to the freeze control register to use a periodic interrupt to sample the trace buffer. In some implementations, a timer may be used to freeze the trace buffer via the debug trace circuitry. For example, a sample rate counter may be implemented by the debug circuitry with a user option of randomization of counts. When counted down to zero, the action may be to freeze the trace buffer and set a freeze cause status. Control software (e.g., JTAG-based, via the host device, or running on the processor core) can poll the freeze cause status to determine when to read the trace. For example, the range of sample times could be from 500 nanoseconds to 1 millisecond based on a maximum processor core clock rate of 5 GHz. The randomization may provide a range of additional clocks to the sample rate clock. The number of bits of randomized count could be from 0 bits (off) to 8 bits. In some implementations, a local counter overflow interrupt (LCOFI) may be enabled to freeze the trace buffer. A program such as perf can configure itself to be interrupted by a same interrupt source, where the interrupt handler (e.g., the interrupt controller 420) can sample the program counter (e.g., the program counter register 414) from an interrupt stack and any other state, such as an scontext control status registers (CSR) in Linux, HPM counters, and the trace buffer. In some implementations, perf can poll the freeze cause status to determine if the trace has stopped. In some implementations, the trigger may be based on a set of choices for when to freeze the trace buffer (e.g., the trigger may be configurable). For example, the trigger could be based on software, a hardware periodic and/or randomized count-down timer, generation of the LCOFI, and/or an external trigger source.

At 804, if a trigger has not occurred ("no"), the process may return to 802. However, if a trigger has occurred ("yes"), at 806 the debug trace circuitry may stop acquisition of records in the trace buffer. At 808, the debug trace circuitry may transfer the one or more records from the trace buffer to the memory (e.g., associated with the host device, such as the host device 320). Thus, the trace buffer can be dequeued and displayed as a standard execution history trace when no branch filtering is applied (e.g., via the host device 320). This may enable correlating counter values to branches taken by a program with a reduced or eliminated degradation of the program so that the program, or a compiler for the program, can be modified to improve performance.

At 810, the debug trace circuitry may resume acquisition of records in the trace buffer. The process may repeat, returning to 802, as the program executes, and the debug trace circuitry generates records responsive to indications of non-sequential executions of instructions by the pipeline.

Some implementations may include an integrated circuit comprising a processor pipeline configured to execute instructions and a debug trace circuitry that is configured to: responsive to an indication of a non-sequential execution of an instruction by the processor pipeline, generate a record including an address pair and one or more counter values, wherein the address pair includes a first address corresponding to a first instruction before the non-sequential execution and a second address corresponding to a second instruction resulting in the non-sequential execution, and wherein the one or more counter values indicate a count of instructions executed. In some implementations, the integrated circuit may include a trace buffer configured to store the record, wherein a trigger stops acquisition of records in the trace buffer while one or more records are transferred from the trace buffer to a memory of a host device. In some implementations, the integrated circuit may include a counter configured to generate the one or more counter values, wherein the counter is a delta counter that clears to zero after the record is generated. In some implementations, the one or more counter values are encoded in a floating point format. In some implementations, the non-sequential execution is caused by a branch instruction that is taken. In some implementations, the integrated circuit may include a trace buffer configured to store the record, wherein the processor pipeline and the debug trace circuitry are implemented together in a processor core and the trace buffer is implemented in the integrated circuit that includes the processor core. In some implementations, the integrated circuit may include a trace buffer configured to store the record, wherein the trace buffer is a circular buffer that overwrites an oldest record with a newest record. In some implementations, the one or more counter values further indicate a count of at least one of a type of instruction executed, cache misses, cycles consumed by cache misses, translation lookaside buffer misses, cycles consumed by translation lookaside buffer misses, or processor stalls.

Some implementations may include an non-transitory computer readable medium comprising a circuit representation that, when processed by a computer, is used to program or manufacture an integrated circuit comprising a processor pipeline configured to execute instructions; and a debug trace circuitry that is configured to: responsive to an indication of a non-sequential execution of an instruction by the processor pipeline, generate a record including an address pair and one or more counter values, wherein the address pair includes a first address corresponding to a first instruction before the non-sequential execution and a second address corresponding to a second instruction resulting in the non-sequential execution, and wherein the one or more counter values indicate a count of instructions executed. In some implementations, the circuit representation, when processed by the computer, is used to program or manufacture the integrated circuit further comprising: a trace buffer configured to store the record, wherein a trigger stops acquisition of records in the trace buffer while one or more records are transferred from the trace buffer to a memory of a host device. In some implementations, the circuit representation, when processed by the computer, is used to program or manufacture the integrated circuit further comprising: a counter configured to generate the one or more counter values, wherein the counter is a delta counter that clears to zero after the record is generated. In some implementations, the one or more counter values are encoded in a floating point format. In some implementations, the non-sequential execution is caused by a branch instruction that is taken. In some implementations, the circuit representation, when processed by the computer, is used to program or manufacture the integrated circuit further comprising: a trace buffer configured to store the record, wherein the processor pipeline and the debug trace circuitry are implemented together in a processor core and the trace buffer is implemented in an integrated circuit that includes the processor core. In some implementations, the circuit representation, when processed by the computer, is used to program or manufacture the integrated circuit further comprising: a trace buffer configured to store the record, wherein the trace buffer is a circular buffer that overwrites an oldest record with a newest record. In some implementations, the one or more counter values further indicate a count of at least one of a type of instruction executed, cache misses, cycles consumed by cache misses, translation lookaside buffer misses, cycles consumed by translation lookaside buffer misses, or processor stalls.

Some implementations may include a method comprising executing instructions in a processor pipeline; and generating, by a debug trace circuitry, a record responsive to an indication of a non-sequential execution of an instruction by the processor pipeline, the record including an address pair and one or more counter values, wherein the address pair includes a first address corresponding to a first instruction before the non-sequential execution and a second address corresponding to a second instruction resulting in the non-sequential execution, and wherein the one or more counter values indicate a count of instructions executed. In some implementations, the method may include storing the record in a trace buffer; and stopping, based on a trigger, acquisition of records in the trace buffer while one or more records are transferred from the trace buffer to a memory of a host device. In some implementations, the method may include using a counter to generate the one or more counter values, wherein the counter is a delta counter that clears to zero after the record is generated. In some implementations, the method may include encoding the one or more counter values in a floating point format. In some implementations, the non-sequential execution is caused by a branch instruction that is taken. In some implementations, the method may include storing the record in a trace buffer, wherein the processor pipeline and the debug trace circuitry are implemented together in a processor core and the trace buffer is implemented in an integrated circuit that includes the processor core. In some implementations, the method may include storing the record in a trace buffer; and overwriting the oldest record in the trace buffer with the newest record in the trace buffer. In some implementations, the one or more counter values further indicate a count of at least one of a type of instruction executed, cache misses, cycles consumed by cache misses, translation lookaside buffer misses, cycles consumed by translation lookaside buffer misses, or processor stalls.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent arrangements.

What is claimed is:

1. An integrated circuit comprising:
    a processor pipeline configured to execute instructions;
    a debug trace circuitry that is configured to:
        responsive to an indication of a non-sequential execution of an instruction by the processor pipeline, generate a record including an address pair and one or more counter values, wherein the address pair includes a first address corresponding to a first instruction before the non-sequential execution and a second address corresponding to a second instruction resulting in the non-sequential execution, and wherein the one or more counter values indicate a count of instructions executed; and
    a delta counter configured to generate the one or more counter values and to clear to zero after the record is generated.

2. The integrated circuit of claim 1, further comprising:
    a trace buffer configured to store the record, wherein a trigger stops acquisition of records in the trace buffer while one or more records are transferred from the trace buffer to a memory of a host device.

3. The integrated circuit of claim 1, wherein the one or more counter values are encoded in a floating point format.

4. The integrated circuit of claim 1, wherein the non-sequential execution is caused by a branch instruction that is taken.

5. The integrated circuit of claim 1, further comprising:
    a trace buffer configured to store the record, wherein the processor pipeline and the debug trace circuitry are implemented together in a processor core and the trace buffer is implemented in the integrated circuit that includes the processor core.

6. The integrated circuit of claim 1, further comprising:
    a trace buffer configured to store the record, wherein the trace buffer is a circular buffer that overwrites an oldest record with a newest record.

7. The integrated circuit of claim 1, wherein the one or more counter values further indicate a count of at least one of a type of instruction executed, cache misses, cycles consumed by cache misses, translation lookaside buffer misses, cycles consumed by translation lookaside buffer misses, or processor stalls.

8. A non-transitory computer readable medium comprising a circuit representation that, when processed by a computer, is used to program or manufacture an integrated circuit comprising:
- a processor pipeline configured to execute instructions; and
- a debug trace circuitry that is configured to:
- responsive to an indication of a non-sequential execution of an instruction by the processor pipeline, generate a record including an address pair and one or more counter values, wherein the address pair includes a first address corresponding to a first instruction before the non-sequential execution and a second address corresponding to a second instruction resulting in the non-sequential execution, and wherein the one or more counter values indicate a count of instructions executed, wherein the one or more counter values are encoded in a floating point format.

9. The non-transitory computer readable medium of claim 8, wherein the circuit representation, when processed by the computer, is used to program or manufacture the integrated circuit further comprising:
- a trace buffer configured to store the record, wherein a trigger stops acquisition of records in the trace buffer while one or more records are transferred from the trace buffer to a memory of a host device.

10. The non-transitory computer readable medium of claim 8, wherein the circuit representation, when processed by the computer, is used to program or manufacture the integrated circuit further comprising:
- a counter configured to generate the one or more counter values, wherein the counter is a delta counter that clears to zero after the record is generated.

11. A method comprising:
- executing instructions in a processor pipeline;
- generating, by a debug trace circuitry, a record responsive to an indication of a non-sequential execution of an instruction by the processor pipeline, the record including an address pair and one or more counter values, wherein the address pair includes a first address corresponding to a first instruction before the non-sequential execution and a second address corresponding to a second instruction resulting in the non-sequential execution, and wherein the one or more counter values indicate a count of instructions executed; and
- using a counter to generate the one or more counter values, wherein the counter is a delta counter that clears to zero after the record is generated.

12. The method of claim 11, further comprising:
- storing the record in a trace buffer; and
- stopping, based on a trigger, acquisition of records in the trace buffer while one or more records are transferred from the trace buffer to a memory of a host device.

13. The method of claim 11, further comprising:
- encoding the one or more counter values in a floating point format.

14. The method of claim 11, wherein the non-sequential execution is caused by a branch instruction that is taken.

15. The method of claim 11, further comprising:
- storing the record in a trace buffer, wherein the processor pipeline and the debug trace circuitry are implemented together in a processor core and the trace buffer is implemented in an integrated circuit that includes the processor core.

16. The method of claim 11, further comprising:
- storing the record in a trace buffer; and
- overwriting the oldest record in the trace buffer with the newest record in the trace buffer.

17. The method of claim 11, wherein the one or more counter values further indicate a count of at least one of a type of instruction executed, cache misses, cycles consumed by cache misses, translation lookaside buffer misses, cycles consumed by translation lookaside buffer misses, or processor stalls.

* * * * *